United States Patent
Jordan et al.

(10) Patent No.: US 12,527,316 B2
(45) Date of Patent: Jan. 20, 2026

(54) REEL AND MAGNETIC HANGING APPARATUS FOR HUNTING DECOY MANAGEMENT

(71) Applicants: Kyle Jordan, Ottawa, KS (US); Baylee Jordan, Ottawa, KS (US)

(72) Inventors: Kyle Jordan, Ottawa, KS (US); Baylee Jordan, Ottawa, KS (US)

( * ) Notice: Subject to any disclaimer, the term of this patent is extended or adjusted under 35 U.S.C. 154(b) by 0 days.

(21) Appl. No.: 18/921,182

(22) Filed: Oct. 21, 2024

(65) Prior Publication Data

US 2025/0324964 A1    Oct. 23, 2025

Related U.S. Application Data

(60) Provisional application No. 63/635,012, filed on Apr. 17, 2024.

(51) Int. Cl.
*A01M 31/06*    (2006.01)

(52) U.S. Cl.
CPC .................... *A01M 31/06* (2013.01)

(58) Field of Classification Search
CPC .................................................. A01M 31/00
See application file for complete search history.

(56) References Cited

U.S. PATENT DOCUMENTS

| | | | | |
|---|---|---|---|---|
| 1,370,145 | A * | 3/1921 | Moore | A01M 31/06 43/3 |
| 2,245,267 | A * | 6/1941 | Elfstrand | A01M 31/06 43/3 |
| 2,747,814 | A * | 5/1956 | Taylor | A01M 31/06 242/379.2 |
| 4,340,192 | A * | 7/1982 | Burris, III | A01M 31/06 242/385.4 |
| 2018/0014530 | A1* | 1/2018 | Sturm | B66D 1/60 |
| 2020/0296953 | A1* | 9/2020 | Johnson | A01M 31/06 |
| 2020/0323196 | A1* | 10/2020 | Clark | B65H 75/4431 |
| 2023/0329226 | A1* | 10/2023 | Uptegrove | A01M 31/06 |
| 2024/0284900 | A1* | 8/2024 | Krohe | A01M 31/06 |

\* cited by examiner

*Primary Examiner* — Richard G Davis
(74) *Attorney, Agent, or Firm* — Dale J. Ream

(57) ABSTRACT

A magnetic hanging apparatus includes (1) a reel around which hunters could neatly wind a plurality of decoy cables and (2) a magnetic interface for hanging the captured hunting decoys to any metal or magnetic surface. In another aspect, the spool may define a hollow bore through which free ends of the plurality of decoy cables may be inserted and coupled together for attachment to a fastener and the magnetic interface.

14 Claims, 4 Drawing Sheets

REEL AND MAGNETIC HANGING APPARATUS FOR HUNTING DECOY MANAGEMENT

REFERENCE TO RELATED APPLICATIONS

This is a non-provisional patent application claiming the priority of provisional application 63/635,012 filed Apr. 17, 2024 titled Multi-Cable Reel and Magnetic Apparatus for Hunting Decoy Management which is incorporated herein by reference in its entirety.

BACKGROUND OF THE INVENTION

This invention relates generally to hanging devices and, more particularly, to a magnetic multi-cable reel assembly for capturing multiple flexible leashes or tethers for winding about a spool or reel and then coupled together with a fastener and hung or stored magnetically.

Duck hunting is an age-old tradition that requires a unique set of skills and equipment. The essential tools for any seasoned duck hunter are artificial decoys which may be strategically placed to attract ducks into shooting range. However, the process of carrying and managing multiple decoys along with other gear can present significant challenges and inconveniences for hunters. Addressing these difficulties could enhance the enjoyment of the hunting experience.

One of the primary issues faced by duck hunters is the cumbersome nature of transporting multiple artificial decoys to and from hunting locations. Typically, hunting decoys consist of floating devices tethered to weights by flexible cables, mimicking the appearance of resting ducks on the water's surface. Manually carrying these decoys along with firearms, ammunition, and other accessories, can be a logistical nightmare particularly when navigating rugged terrain or wading through marshlands. A tangled mess of cables and weights may add to the frustration, often resulting in time-consuming untangling efforts before setting up the decoys. Moreover, storing and organizing decoys at home can be equally challenging with cables sprawling across floors and taking up valuable space.

Therefore, it would be desirable to have a spool designed for winding together a plurality of decoy cables such that tangling is avoided and multiple decoys are kept together. Further, it would be desirable to have a spool for managing a plurality of decoys that may be hung or stored magnetically to a magnetic or metal structure.

Therefore, a hunting decoy spool and magnetic hanging apparatus according to the present invention includes (1) a reel around which hunters could neatly wind a plurality of decoy cables and (2) a magnetic interface for hanging the captured hunting decoys from any metal or magnetic surface. In another aspect, the spool may define a hollow bore through which free ends of the plurality of decoy cables may be inserted and even tied together for attachment to a fastener and the magnetic interface.

SUMMARY OF THE INVENTION

A magnetic hanging apparatus according to the present invention includes (1) a reel around which hunters may neatly wind a plurality of hunting decoy cables and (2) a magnetic interface for hanging the captured hunting decoys to any metal or magnetic surface. In another aspect, the spool may define a hollow bore through which free ends of the plurality of decoy cables may be inserted and even tied together for attachment to a fastener and the magnetic interface.

Therefore, a general object of this invention is to provide a multi-cable spool and magnetic hanging apparatus for managing multiple flexible cables associated with a plurality of artificial decoys.

Another object of this invention is to provide a multi-cable spool, as aforesaid, that includes a strong magnet coupled to the ends of the multiple cables for hanging the entire apparatus from a metal or magnetic surface Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
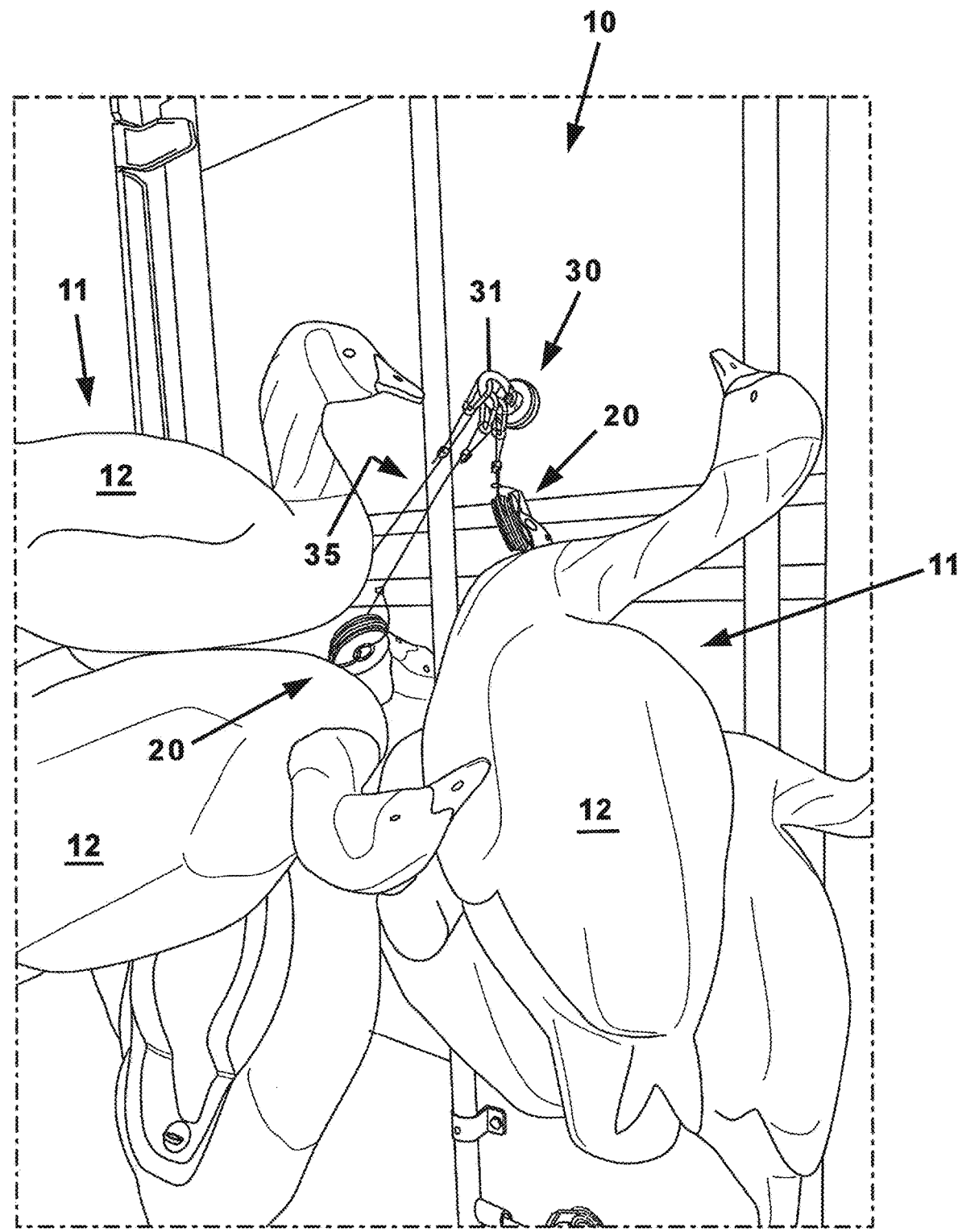
FIG. 1 is a perspective view of a reel and magnetic hanging apparatus according to a preferred embodiment of the present invention for storing or transporting a plurality of hunting articles such as duck decoys.
Figure 3:
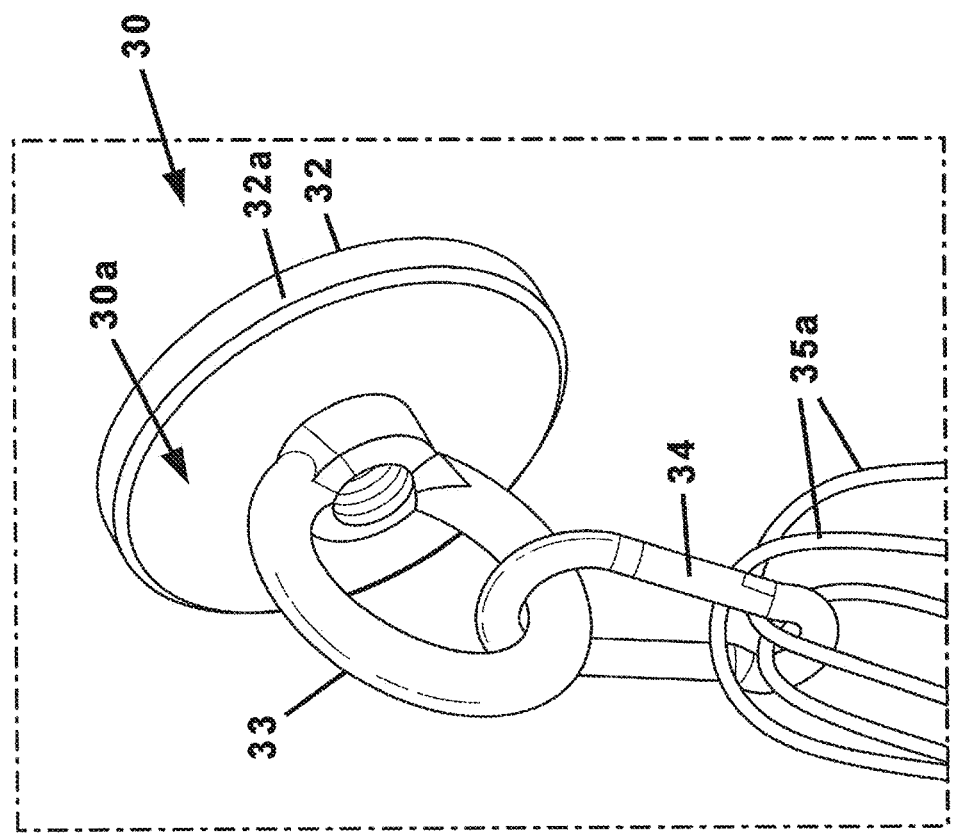
FIG. 3 is a perspective view of the magnet hanging assembly according to the present invention.

A multi-cable reel and magnetic hanging apparatus according to a preferred embodiment of the present invention will now be described with reference to the accompanying drawings. More particularly, the multi-cable reel and magnetic hanging apparatus 10 includes a reel assembly 20 and a magnet assembly 30.

The present invention provides an apparatus and method that enables a hunter to store, carry, and transport stringers of duck decoys or other hunting-related objects. For instance, a stringer of duck decoys 11 may include a plurality of decoy bodies 12, each body 12 having a flexible string, cable, or cord extending away from the corresponding body, the flexible cable itself being referred to with reference character 13 and which may include a first end 13a which may have a looped configuration coupled to a decoy body 12 and a second end 13b generally opposite the first end 13a. In the following description, it will be understood that references to the first and second ends 13a, 13b may also refer broadly to portions adjacent or proximately adjacent said ends.

In a first critical aspect, the magnetic hanging apparatus 10 includes a reel assembly 20 which may also be referred to as a spool. The reel assembly 20 may include a hub 21 having a circular configuration and a pair of rims 22 extending in parallel about a peripheral edge of the hub 21. Preferably, the hub 21 and the rims 22 have a unitary construction. The rim 22 defines a groove 23 for receiving cables 13 and about which the cables 13 may be wound so as to prevent them from becoming knotted or entangled with one another. The hub 21 defines a throughbore 24 through which respective second ends 13b of the cables 13 may be inserted so as to be subsequently wound about the groove 23 of the rim 22.

It should be noted that the reel assembly 20, and particularly the rim 22, may be configured to receive a plurality of cables 13 simultaneously, in which case, the plurality of cables 13 may be either uniform or disparate in both length and diameter. Furthermore, in an embodiment, the reel assembly 20 may comprise a plurality of individual reel assemblies 20, each of which comprises a circular hub 21 defining a throughbore 24 into which the second ends 13b of the cables 13 may be placed and a rim 22 extending about a peripheral edge of the hub 21 and defining a groove 23 for receiving cables 13. If desirable, the plurality of individual reel assemblies 20 may vary in width and diameter in order to accommodate the greatest possible variety of cables 13. In other words, multiple strings of duck decoys or other hunting-related objects may be coupled to a single magnet member. Further, the reel assembly 20 may be constructed of metal, a hard plastic, or some other durable composite material.

Figure 2:
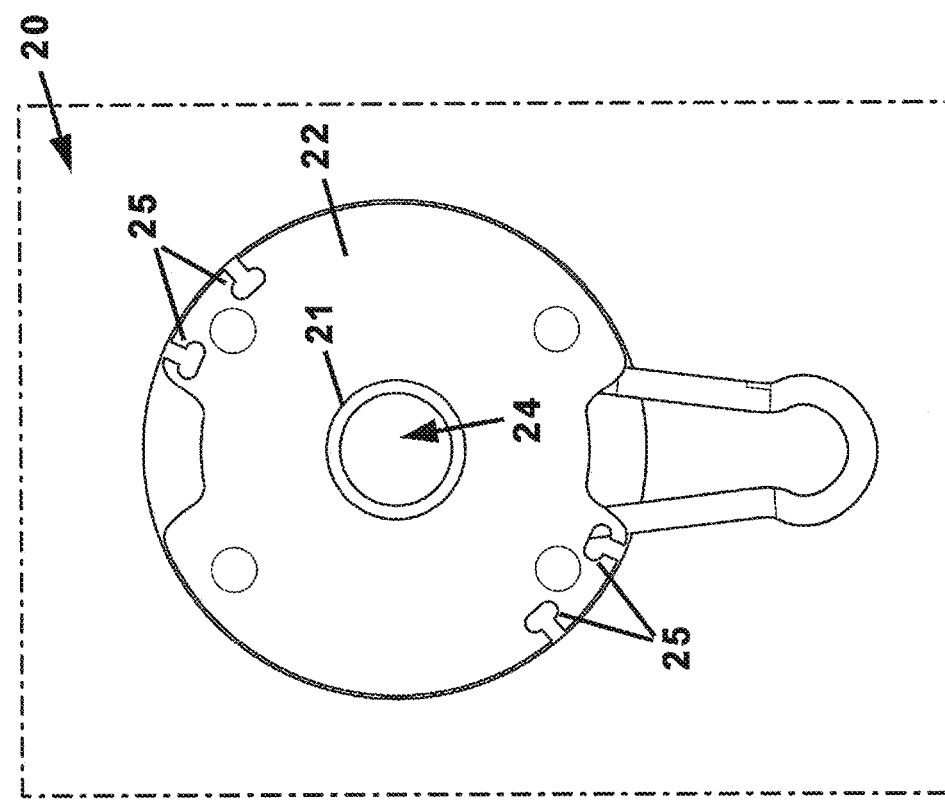
FIG. 2 is a front view on an enlarged scale of a spool according to the present invention.
Figure 4:
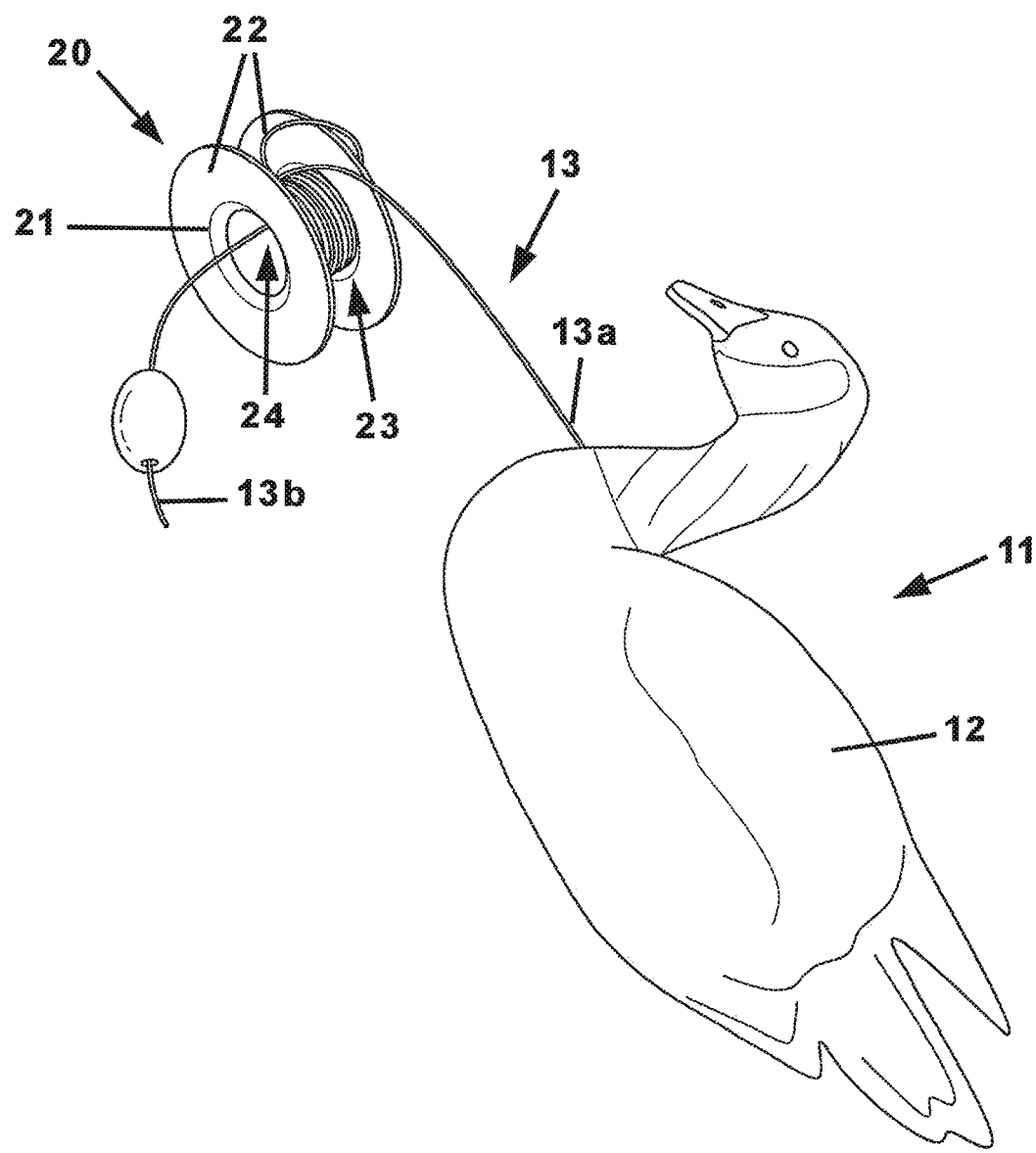
FIG. 4 is a perspective view of the spool coupled to a duck decoy via a cable wrapped repeatedly about the spool body.

Furthermore, the rim 22 may also define one or more notches 25 having dimensions to receive and capture a single cable 13 and configured to hold this cable 13 in a friction fit arrangement, i.e., either end of the cable 13 may be removably positioned within the boundary of the notch 25 (FIG. 2). Thus, the cable 13 may be secured in a desired position and prevented from unwinding or loosening once it has been properly stored.

In another critical aspect, the magnetic hanging apparatus 10 includes a magnet assembly 30 having a magnet body 30a. The magnet assembly 30 is operatively coupled to the first ends 35a of the flexible cables 35. A rear face 32 of the magnet body 30a is magnetically attracted to any metal object such that it may be operatively attached to a variety of metal surfaces. Suitable metal surfaces may include, but are certainly not limited to, a door frame, a coat rack, metal signage, a gun or the like. It should be noted that the magnet assembly 30 must produce a sufficiently strong magnetic attraction so that the plurality of hunting articles may be operatively hung from the metal object to which the magnet assembly is attracted. Stated another way, the magnetic attraction between the magnet assembly and the magnetic object to which it is attached must be strong enough to overcome the combined weight of the magnetic hanging apparatus 10 and the plurality of hunting articles attached thereto. Furthermore, for the sake of space efficiency, it may be desirable that the magnet assembly 30 remain relatively small and compact. One skilled in the art will appreciate that proper amounts of ferromagnetic materials (iron, nickel, cobalt, and their alloys) are capable of producing such an attraction, although rare earth metals such as neodymium and samarium may also be used.

More particularly, the magnet assembly 30 includes a front face 31 and a rear face 32 opposite the front face. The rear face 32 is planar and defines a magnetic interface 32a which is designed to attach to any metal object as previously described. In an important aspect, the magnet assembly 30 further includes a ring fastener 33 mounted to the front face 32 thereof and may removably coupled to a quick-connect fastener 34. More particularly, the quick-connect fastener 34 may be coupled to the ring fastener 33 via welding, with a wire interface, a hook interface, or even having a unitary construction. The quick-connect fastener 34 is configured to selectively receive or release the first ends 35a of the cables 35 depending on whether the hunting articles are being stored or used, respectively.

Figure 5:
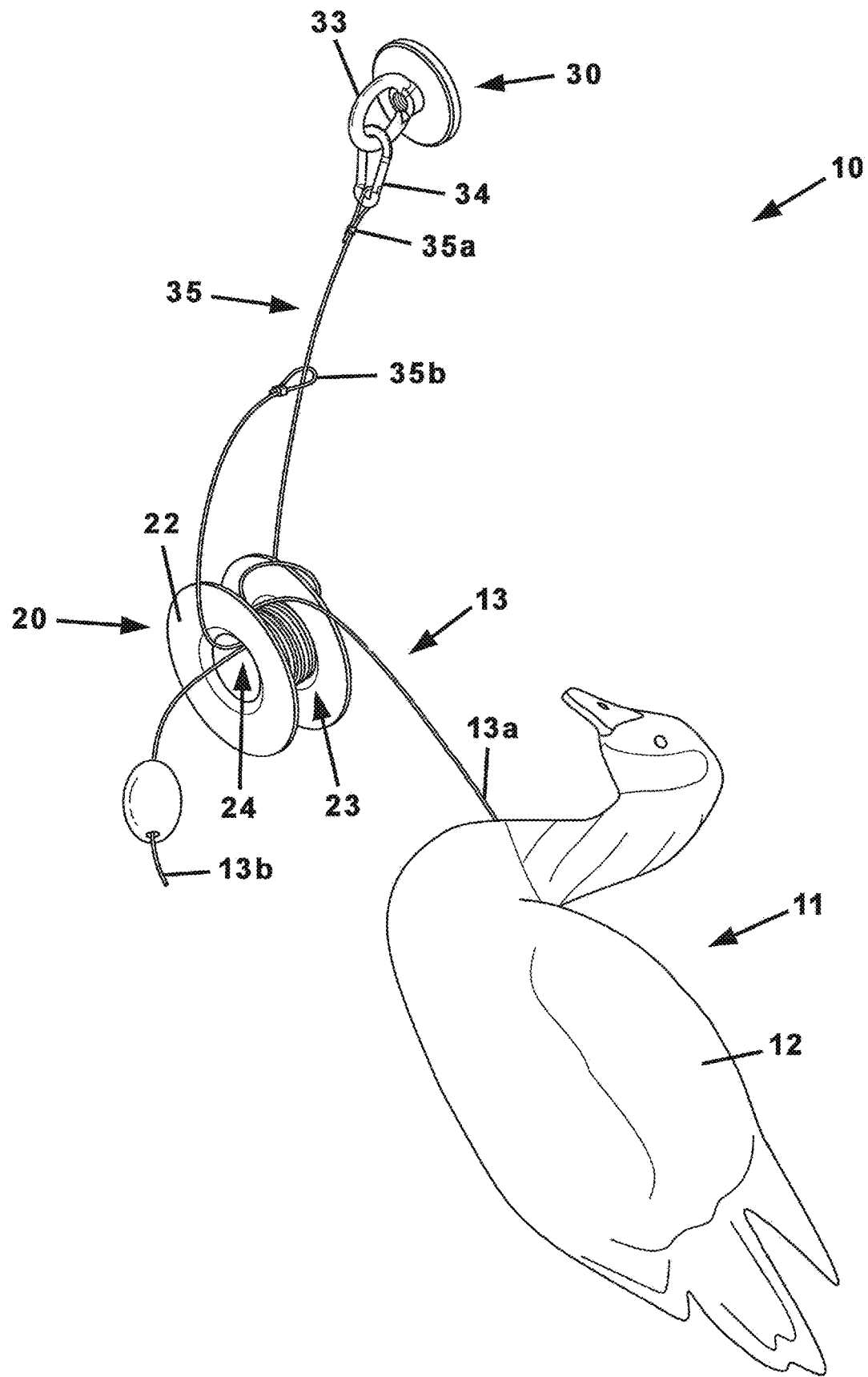
FIG. 5 is a perspective view of a reel and magnetic hanging apparatus according to a preferred embodiment of the present invention.

In use, the cables 35 include second ends 35b that may be coupled to respective reel assemblies 20 and decoys 11 described previously. More particularly, the second end 35b may be inserted through the throughbore 24 of the reel assembly 20 may include a looped end that may be looped back upstream as shown in FIG. 5. Described another way, a respective reel assembly 20 may be independently coupled to cables 35 and 13 in order to suspend a plurality of duck decoys 11 from a magnet assembly 30.

Accordingly, the hunting articles are operatively hung from the magnet assembly 30 via the quick-connect interface. In the preferred embodiment, the quick-connect fastener 34 may be a carabineer of suitable size to receive the first ends 35a of multiple cables 35 and sufficient carrying capacity to support the weight of the plurality of hunting articles. However, in some embodiments, devices other than a carabineer may be used such as a spring-activated keychain or other fastener that allows single-handed operation.

By way of example, a hunter may use the multi-cable reel and magnetic hanging apparatus 10 to store hunting articles in the following manner: first, the hunter selects the hunting articles he wishes to store using the apparatus. Then, the hunter straightens the flexible cables 35, ensuring that they are free of kinks, knots, tangles, or any such impediments to efficient storage. Then the hunter proceeds to wind the second ends 13b of the cables 13 about the groove 23 provided by the reel assembly 20. When a sufficient amount of the length of the cable 13 has been wound about the groove 23, the hunter inserts the second end 13b of the cable 13 through the throughbore 24 of the hub 21 These steps may be repeated until all the hunting articles have been stored in this manner. It is understood that when multiple cables 13 are stored on a single reel assembly 20, a more complicated method including laid out what additional steps may be required; however, the basic steps provided herein remain essential to the function of the apparatus.

It is understood that while certain forms of this invention have been illustrated and described, it is not limited thereto except insofar as such limitations are included in the following claims and allowable functional equivalents thereof.

The invention claimed is:

1. A magnetic hanging apparatus for capturing, transporting, and storing a plurality of hunting articles each of which has a flexible cable that includes opposed first and second ends, said magnetic hanging apparatus comprising:

a reel assembly that includes a hub having a circular configuration and a rim extending about a peripheral edge of said hub, said rim defining a groove for receiving respective cables of at the plurality of hunting articles, said hub defining a throughbore through which respective second ends of the flexible cables received in said groove of said rim are inserted;

a magnet assembly operatively coupled to said first ends of the flexible cables, respectively, said magnet assembly being magnetically attracted to any ferromagnetic object such that the plurality of hunting articles is operatively hung from the metal object to which said magnet assembly is attracted.

2. The magnetic hanging apparatus of claim 1, further comprising a quick-connect fastener coupled to said magnet assembly that is configured to selectively receive or release said first ends of the flexible cables, respectively.

3. The magnetic hanging apparatus of claim 2, wherein said quick-connect fastener is a carabiner.

4. The magnetic hanging apparatus of claim 2, wherein said magnet assembly includes:

a front face having a planar configuration and a rear face opposite said front face;

a ring fastener mounted to said rear face of said magnet assembly, said quick-connect fastener being coupled to said ring fastener.

5. The magnetic hanging apparatus of claim 1, wherein said rim has a configuration for receiving a plurality of the cables of the plurality of hunting articles simultaneously.

6. The magnetic hanging apparatus of claim 1, wherein said reel assembly includes a plurality of reel assemblies, each reel assembly including a hub having a circular configuration and a rim extending about a peripheral edge of said hub, said rim defining a groove for receiving respective cables of the plurality of hunting articles.

7. The apparatus of claim 1, wherein said plurality of hunting articles are hunting decoys.

8. A method for capturing, transporting, and storing a plurality of hunting articles each of which has a flexible cable that includes opposed first and second ends, said method comprising:

receiving respective second ends of respective cables of the plurality of hunting articles into a groove defined by a rim that extends about a peripheral edge of a hub;

inserting the respective second ends of respective cables received into said rim through a throughbore defined by said hub;

coupling together the respective second ends having been inserted through said throughbore;

releasably attaching respective first ends of respective flexible cables to a magnet assembly;

releasably coupling said magnet assembly to an environmental surface via magnetic attraction such that the plurality of hunting articles is operatively hung from the magnet assembly and the environmental surface.

9. The method of claim 8 further comprising selectively receiving respective first ends of respective flexible cables into a quick-connect fastener that is fastened to said magnet assembly.

10. The method of claim 9, wherein said quick-connect fastener is a carabiner.

11. The method of claim 8, wherein said rim has a configuration for receiving a plurality of the cables of the plurality of hunting articles simultaneously.

12. The method of claim 8, wherein said magnet assembly includes:

a front face having a planar configuration and a rear face opposite said front face; and a ring fastener mounted to said rear face of said magnet assembly, said quick-connect fastener being coupled to said ring fastener.

13. The method of claim 8, wherein said reel assembly includes a plurality of reel assemblies, each reel assembly including a hub having a circular configuration and a rim extending about a peripheral edge of said hub, said rim defining a groove for receiving respective cables of the plurality of hunting articles.

14. The apparatus of claim 8, wherein each of said plurality of hunting articles is a duck decoy.

* * * * *